(12) United States Patent
Chen (10) Patent No.: US 11,774,337 B2
(45) Date of Patent: Oct. 3, 2023

(54) DEVICE AND METHOD FOR FLUID AND EQUIPMENT MONITORING

(71) Applicant: James J Chen, Houston, TX (US)

(72) Inventor: James J Chen, Houston, TX (US)

(*) Notice: Subject to any disclaimer, the term of this patent is extended or adjusted under 35 U.S.C. 154(b) by 216 days.

(21) Appl. No.: 17/136,000

(22) Filed: Dec. 29, 2020

(65) Prior Publication Data

US 2022/0205890 A1 Jun. 30, 2022

(51) Int. Cl.
*G01D 7/00* (2006.01)
*G01N 9/32* (2006.01)
*G01D 21/02* (2006.01)
*G05D 7/06* (2006.01)

(52) U.S. Cl.
CPC .................. *G01N 9/32* (2013.01); *G01D 7/00* (2013.01); *G01D 21/02* (2013.01); *G05D 7/0623* (2013.01)

(58) Field of Classification Search
CPC ........... G01N 9/32; G05D 7/0623; G01D 7/00
See application file for complete search history.

(56) References Cited

U.S. PATENT DOCUMENTS

| | | |
|---|---|---|
| 6,832,506 B1 | 12/2004 | Mason |
| 8,820,147 B2 | 9/2014 | Sinha |
| 9,470,667 B2 | 10/2016 | Krumholtz |
| 9,816,848 B2 | 11/2017 | Raykhman et al. |
| 2009/0025487 A1 | 1/2009 | Gysling et al. |
| 2011/0056298 A1 | 3/2011 | O'Keefe |
| 2011/0154884 A1 | 6/2011 | Weppenaar et al. |
| 2011/0287469 A1 | 11/2011 | Guenther et al. |
| 2011/0314929 A1 | 12/2011 | Limacher et al. |
| 2013/0042698 A1 | 2/2013 | Mayr |
| 2013/0125655 A1 | 5/2013 | Klopffer et al. |
| 2014/0097367 A1* | 4/2014 | Burt .................... F24D 19/1015 251/129.04 |
| 2015/0308917 A1 | 10/2015 | Soda |
| 2017/0336231 A1 | 11/2017 | Hermann |
| 2018/0188700 A1* | 7/2018 | Penley .................... G01F 25/15 |
| 2018/0003066 A1 | 10/2018 | Bar-Cohen et al. |
| 2019/0257700 A1 | 2/2019 | Lewis et al. |
| 2019/0145207 A1* | 5/2019 | Russell ................. G01F 1/8413 166/250.01 |
| 2019/0376937 A1* | 12/2019 | Tarafder ................. G01N 30/32 |
| 2020/0003646 A1 | 1/2020 | Krywyj et al. |

\* cited by examiner

*Primary Examiner* — Paul J Gray
(74) *Attorney, Agent, or Firm* — Ingenium Patents LLC; Peter R. Kramer (57) ABSTRACT

A device is provided that is intended to simultaneously measure and identify at least two characteristics of multi-phase fluid flows through the device and/or equipment attached to the device. The device has a lower measurement medium invasive compartment comprised of at least two ultrasonic and/or acoustic transducers, a piezo-resistive sensing element, and a resistance temperature detector (RTD) to make simultaneous independent measurement. A pathway connects to the device's upper electronic compartment comprised of an accelerometer array, multiple stacked circuit boards providing power, sensing interface, processing, calculation, and network communication functionalities. The device is capable of measuring, processing, and calculating simultaneous independent pressure, temperature, flow rate, and vibration measurement. The device reports data to an external system via either wired and/or wireless communication channel.

2 Claims, 10 Drawing Sheets

DEVICE AND METHOD FOR FLUID AND EQUIPMENT MONITORING

CROSS-REFERENCE TO RELATED APPLICATIONS

N/A

STATEMENT REGARDING FEDERALLY SPONSORED RESEARCH OR DEVELOPMENT

N/A

THE NAMES OF THE PARTIES TO A JOINT RESEARCH AGREEMENT

N/A

BACKGROUND OF THE INVENTION

In many different industries involving transporting multiphase fluid from one location to another location and controlling the process the fluid, instrumentation is needed to measurement the properties of the fluid and equipment providing the source of energy such as pump, compressor, and similar rotating equipment. Instrument measured data has many applications, for example certain multiphase fluid needs to be transported under specified pressure and temperature in order to remain in its liquid or gaseous phase; thus continuously monitoring pressure and temperature measurement data is critical to ensure the safety and requirement of the transportation condition being met. Another example, a rotating equipment providing the mechanical energy source for the fluid process and transportation needs to be continuously monitored with vibration sensor to ensure it's operating at designed speed such as revolution per minute (RPM).

There are many different types of instrument in prior art measuring one or more fluid properties. Often, a single fluid property can measured by multiple different technologies. For example, fluid temperature could be measured by thermocouple, resistance temperature detector (RTD), or thermistor. Each one of those temperature measurement sensor has a different working principal, device structure, and installation style; but yet all three types of temperature measurement device provide the same purpose that is fluid temperature measurement. Another example is pressure sensor that include capacitive, magnetic, optical, piezoelectric, Piezoresistive, resistive, and resonant frequency technology widely available in prior art. Another example is volumetric flow rate measurement instrument, different types of flow meter include but not limited to mechanical, Coriolis, and differential temperature flow meter. The majority of the instruments existing in the market today are designed to make a single fluid property measurement and are known as single purpose instruments.

FIELD OF THE INVENTION

The inventive subject matter disclosed herein relates to methods and devices for measuring characteristics of multiphase fluids including multiphase fluids in fluid transport systems. Specifically, the methods and devices relate to utilizing invasive sensing elements for measuring fluid characteristics.

DESCRIPTION OF RELATED ART INCLUDING INFORMATION DISCLOSED UNDER 37 CFR 1.97 AND 1.98

Mason U.S. Pat. No. 6,832,506 B1 discloses a drop head device with acoustic sensors and can detect changes in size and shape of a droplet of fluid. Raykhman et al U.S. Pat. No. 9,816,848 B2, discloses a non-invasive apparatus for measuring physical properties in a conduit. Several meters/sensors are located about the conduit. Sinha U.S. Pat. No. 8,820,147 B2, discloses a multiphase fluid characterization system having several separate individual sensors that are positioned on outer surface of a pipe at various locations. Krumholtz U.S. Pat. No. 9,470,667 B2, discloses an invasive sensor with a probe for determining limit level and density or viscosity. The limit level is sensed based on the position of the sensor that is placed on a container. It is comprised of a single sensor with a process connector, sensing element and housing. O'Keefe US 20110056298 A1, discloses non-invasive measurement of velocity of slurry flow in horizontal pipes. The method utilizes In contrast to known manual methods, the method uses a permanently or semi-permanently installed ring of conformable ultrasonic transducers clamped on to the outside of the pipe. Mayr et al US 2013/0042698 A1, discloses a method and apparatus for determining at least one flow characteristic of an essentially laminar flowing, gaseous or liquid medium in a pipeline. An apparatus having a modulation element placed in the pipeline that changes the density of the fluid, which is determined with an oscillatable unit which receives mechanical oscillations that are converted into electrical signals sensitive to the density changes thereby determining at least one flow characteristic of the medium. Hermann et al US 2017/0336231 A1, discloses a non-invasive measuring apparatus for determining the flow speed of a fluid flowing in a conduit. An ultrasonic transducer is attached to the conduit wall from the outside and has an oscillating body coupled to a region on the outside of the pipe which can vibrate.

BRIEF SUMMARY OF THE INVENTION

The present inventive subject matter provides embodiments including an integrated device and method to measure at least two characteristics of multiphase fluid and/or equipment attached to the device such as pressure, temperature, flow rate, and/or vibration simultaneously. Measurement data is analyzed and modeled locally within the device as well as remotely on an external system to gain more insight into the monitored multiphase fluid and/or equipment.

One embodiment has a single process connection point allowing ease of installation on to any standardized pipe, flange, and equipment instrument connection point. In the device structure, a lower section is invasively installed into the measuring fluid and/or equipment contains different sensing elements providing simultaneous independent measurements and an upper section contains all the electronics to convert sensing element measurement signal, process calculation, operate wireless communication signal, display measurement result, and supply power to the entire unit. The instrument contains a networked processor allowing real-time data analysis model and algorithm runs inside of the unit locally, software updates remotely, and measurement result reports to the server wirelessly. The present invention replaces multiple single purpose instrument, electrical interface electronic module, wired/wireless communication equipment, and single purpose measurement software with a single integrated instrument. The advantage of the present invention include but not limited to technology advances on simultaneous measurement, installation time reduction, supplementary material (ex. cable, conduit, cable gland, flange, etc.) reduction, system cost effectiveness, networked communication, and ease of instrument maintenance/system updates.

The design of the invention overcomes many technical challenges. In a typical ultrasonic flowmeter design, signal to noise ratio (SNR) can be small such that transmitter generated signal attenuates in the fluid medium and buried under the noise level below the receiver signal detection threshold. In order to maximize the SNR, the present invention implemented a unique mechanical design to optimize the ultrasonic signal propagation pattern and impedance matching circuit on both the transmitter and receiver to maximize signal power. On the pressure measurement side, a miniaturized bridge sensing element is implemented to minimize the physical dimension and the same technique is applied to the temperature sensing element as well allowing physical size to be minimized.

Other embodiments of the invention provide an illustration of installing a single device on a section of pipe to measurement characteristics of fluid flowing through the instrument. The sensing element compartment invasively in contact with the flowing fluid and making simultaneous independent measurement. The invention reports measurement result to a traditional control system such as programmable logic controller (PLC) via wired bus and communicates to either local router or remote network server via wireless radio frequency (RF) signal in parallel. A specific technical solution example of this embodiment is homogenous fluid density monitoring during fluid transportation process. Another technical solution example of this embodiment is target measurement within a fluid proportional-integral-derivative (PID) control loop.

In other embodiment multiple devices installed along a section of pipe in a linear offset formation enabling of pressure measurement at two different locations. The differential pressure between the two devices is calculated by subtracting the pressure measurement values. As a result, a differential pressure (DP) flowmeter is obtained based on underlying physics principal.

In another embodiment, an array of devices are installed along a section of pipe with both linear and radial offset. Each device measures a set of fluid characteristics simultaneous, and measurement result is used as boundary condition to reconstruct three-dimensional flow through pipe image using prior art mathematical model.

In another embodiment, a device is installed in addition to multiple existing single purpose instrument such as pressure meter. A wired/wireless connection is made between each single purpose instrument and the device. All of the single purpose instrument measurement data is communicated to the device while the invention device makes its own independent measurement. The device processes the single purpose instrument data along with its own measurement data and reports all of the result to networked external systems.

In another embodiment, the device is not installed on a section of pipe and only connected to a single purpose instrument bus acting as an interface between all the single purpose instrument and external system. The sensing element compartment of the device could be eliminated to further reduce system cost in this configuration. In addition, sensing interface electronics inside of the device could be eliminated to further reduce mechanical size allowing device easily connects to any single purpose instrument.

BRIEF DESCRIPTION OF THE SEVERAL VIEWS OF THE DRAWING(S)

Embodiments of the present invention, presented by way of example only, will now be described, with reference to the accompanying drawings, wherein like reference numerals refer to like parts, and wherein.

INDEX OF REFERENCE NUMERALS

Number Description
100 Device
101 First transducer
102 Pressure sensing element
103 Resistance temperature detector
104 Second transducer
105 Invasive sensing compartment
106 Cylindrical conduit
111 Sensor interface MCU PCB
112 External system interface PCB
113 Communication PCB
114 Power supply
115 Display
116 Stackable connector
117 Upper electronic compartment
119 Threaded connection
120 Fluid flowing
121 Section of pipe
151 Array of triple axis mems accelerometers
155 Clock circuit 156 Analog front end circuitry
159 Pressure sensing AFE
160 Ultrasonic TDC
161 Temperature ADC
162 Accelerometer ADC 162
163 Pressure ADC
164 Microcontroller unit
201 System initiation step
202 Operating mode check
203 Round robin measurement command
204 Retrieve data from individual measurement buffer
205 Data processing and calculation
206 Format final measurement result
207 Report measurement result
231 Threaded opening
251 External control system
252 Wired connection
252 Wired network
253 Non-premises local network server
254 Wireless connection
255 On-premises local router
261 Radial space between two devices
262 Linear space between two devices
263 Both radial and linear space between two devices
302 Vessel
303 Pump
304 Vibration meter
305 Pressure meter
306 Flow meter
307 Temperature meter
308 Regulator valve
309 Process
310 Edge computer
311 Wireless network
312 First process
313 Second process
351 Networked mobile terminal
352 Networked terminal

DETAILED DESCRIPTION OF THE INVENTION

A brief overview of the embodiments of the invention will first be given, followed by a detailed description of particular embodiments.

The present invention provides an integrated instrument to measure multiphase fluid and equipment characteristics such as pressure, temperature, flow rate, and vibration. The present invention has a single mechanical connection point mounts to a section of pipe or equipment invasively in contact with the measurement medium. The connection style is typically threading, but it could be any other connection style such as flange, epoxy, pressure insert, clamping, and welding. Once the instrument is connected to the system to be measured and system is in run mode, monitoring can start to take place. In the lower instrument invasive compartment comprised of at least two ultrasonic and/or acoustic transducers, a piezo-resistive sensing element, and a resistance temperature detector to make simultaneously independent measurement. A conduit pathway connects to the device upper electronic compartment encloses an accelerometer array, multiple stacked circuit boards providing power, sensing interface, processing, calculation, and wired and/or wireless communication functionalities. The device is capable of make, process, and calculate simultaneous independent pressure, temperature, flow rate, and vibration measurement. The device reports measurement result to external system via either wired and/or wireless communication channel.

The present invention uses a piezo-resistive element for pressure measurement, as the pressure changes the resistance of the piezo sensing element changes proportionally. In order to increase sensitivity, a full bridge circuit is designed, which utilizes multiple known resistance values as reference and configures in a bridge layout to the sensing piezo-resistive pressure sensing element. The circuit provides excitation voltage typically 5V to the piezo-resistive sensing element as pressure changes the piezo-resistive sensing element changes its resistance value thus the sensing element output voltage changes since a constant excitation voltage source is applied to it. The small piezo-resistive sensing element produced voltage is then amplified through a programmable gain amplifier (PGA) to amplify the signal level to an analog to digital converter (ADC) minimum input level. Once piezo-resistive pressure sensing data is digitized, the ADC transfers the digitized data to a microcontroller unit (MCU) for data conditioning and reporting. For measurement of vibration, a triple axis micro-electromechanical system (MEMS) is designed to measure vibration data with a MEMS based accelerometer to produce acceleration data in an analog time domain format initially, an ADC samples the analog signal and converts it into a digital format with filtering to remove unwanted high frequency noise. Also, resistance temperature detector has similar electronic architecture and working principal. As temperature on the sensing element changes, the resistance of the RTD changes, additional bridge resistor is added to the analog front end (AFE) circuitry to improve output measurement accuracy and sensitivity. A constant voltage source is applied to the resistance measurement circuitry, as resistance changes due to temperature change the output voltage changes and this output voltage is measured by an ADC that sends the final result to a MCU to further processing. Flow rate measurement on the device is based on ultrasonic time of flight (TOF) principal, which measures the transit time of signal in both downstream and upstream direction then calculation is carried out by subtracting the two to obtain flow velocity. Volumetric flow rate is calculated by using the flow velocity times cross sectional area of the pipe.

The present invention utilizes a single mechanical structure, which comprised of a lower invasive sensing compartment and upper electronic compartment connected by an conduit where electrical wire runs between each individual sensing element and sensing interface circuitry. Pressure, temperature, and flow sensing element are mounted inside of the lower invasive sensing compartment through threading and epoxy or any other mounting method. In a typical application, the invasive sensing compartment is in contact with the measurement medium to provide in-situ fluid and equipment characteristics measurement. In the upper electronic compartment, a sensing interface circuitry and microcontroller printed circuit board (PCB) is connected to each individual sensing element via electrical conductor cable, which is used for power and signal. An input output (IO) PCB provides digital input, analog input, digital output, and analog output to any external system is connected to the sensing interface and MCU PCB via a stackable style of connector, which is designed to connect individual PCB with different functionality. A common power, ground, and signal bus is shared among different PCB via the individual pin on the stackable connectors thus order of stacking of each PCB is not important. A communication PCB that has a central processing unit (CPU), peripheral, memory, wired communication, and wireless communication is also on the stackable connector bus. Advanced data computation, signal processing, and modeling could be run on the communication PCB in addition to wired and/or wireless communication to external system. Also connected on the stackable bus connector, a power supply PCB provides power converter and external wire connection location. The power supply PCB converts external alternating current (AC) and/or direct current (DC) power source down to device usable DC power supply level, which is typically at five voltage. A display PCB is at top of the PCB stack with power and signal connected to provide local display of measurement data.

The present invention incorporates parallel electronic circuitry and software process design allowing simultaneous measurement of the fluid flows through and equipment attaches to the device. Each sensing element has individual signal conditional chain as well as dedicated ADC to filter, amplify, and sample the measurement analog signal. In the data acquisition process, individual hardware is initialized first, then measurement occurs in a parallel simultaneous fashion. Each measurement signal chain has dedicated buffer to store data result temporally; if one sensing element data acquisition process is faster than another, the faster process just stores measurement result in its assigned buffer while waiting idle for another measurement process to complete. Once all measurement process is completed and data is stored in the temporary buffer, MCU sequentially retrieve the data result from individual measurement process buffer. Post data processing then occurs in MCU to remove any unwanted measurement noise and outlier data.

The design of the invention overcomes many technical challenges. In a typical ultrasonic flowmeter design, signal to noise ratio (SNR) can be small such that transmitter generated signal attenuates in the fluid medium and buried under the noise level below the receiver signal detection threshold. In order to maximize the SNR, the present invention implemented a unique mechanical design having each miniaturized ultrasonic piezo transducer mounted inside of a step profile compartment to optimize the ultrasonic signal propagation pattern. The unique mechanical design allows transducer physically closer to the measurement fluid center streamline and controls the amount of signal attenuation in unwanted direction of ultrasonic wave propagation. The miniaturized ultrasonic piezo transducer typically has high intrinsic capacitance, an impedance matching circuit on both the transmitter and receiver is designed to maximize signal power using the well-known maximum power transfer theorem:

$$Z_L = Z_S^*$$

Where $Z_L$ is the load impedance and $Z_S^*$ is the complex conjugate of the source impedance. The transmitter and receiver circuit is designed based on the principal above. On the pressure measurement side, due to the limited physical dimension on the present invention device, a miniaturized bridge sensing element is implemented to overcome this challenge. In addition, the same mechanical repackaging design is copied to the temperature sensing element as well. Both miniaturized pressure and temperature sensing element can be manufactured using the same process, thus lowering the manufacturing cost by repeating the same step multiple times. The present invention device has a unique design that overcomes many technical difficulties.

In a typical embodiment, one device is installed on a section of pipe which is attached to a mechanical energy source such as pump or compressor with fluid moving from one point to another point inside the pipe. The single device monitors pressure, temperature, flow rate, and vibration data of the fluid flows through the pipe as well as equipment attach to the pipe. In another embodiment, a second device is installed on the same section of pipe on the opposite or at an offset angle of the first device to provide radial measurement data of the section of fluid flows through. More than two devices could be installed along the radial direction to provide an image of the fluid flows through the pipe section and/or three-dimensional attached equipment condition. In other embodiment, instead of radially install the present invention, more devices could be installed at an offset linear along the section of pipe and/or equipment attached. A linear device array has many different applications, for example a differential pressure flow meter could be constructed this way since each device has its own pressure measurement and differential pressure could be obtained by subtracting the pressure measurement data at two different devices along the section of pipe. A large scale of the device could be installed to provide many monitoring points on a large complex system and data could be synchronized via a wired and/or wireless network to a centralized supervisory system.

A more detailed embodiment of the invention will be described with reference to FIGS. 1 to 15.

Figure 1:
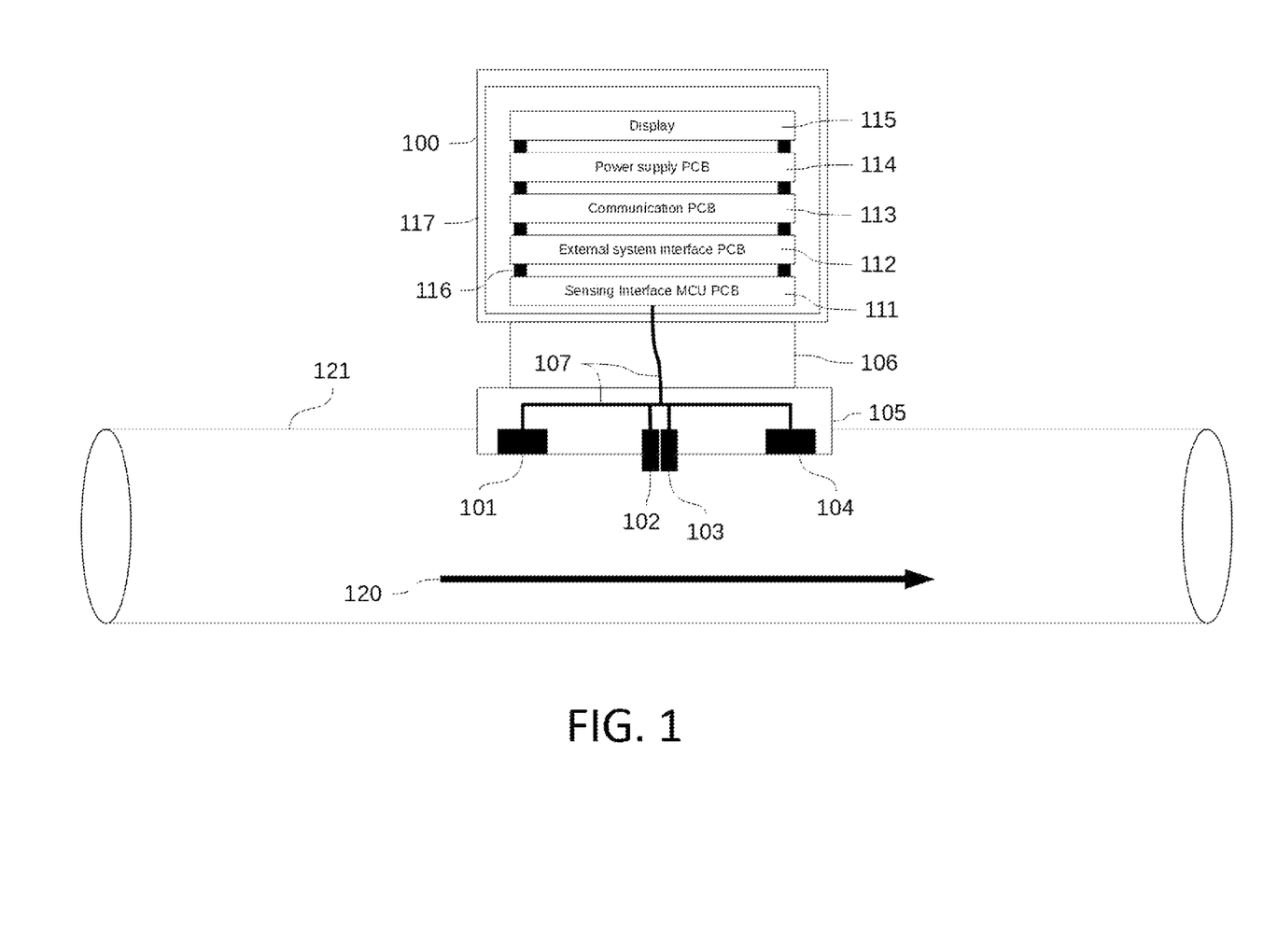
FIG. 1 represents a cross sectional view with major components shown of the device for fluid and equipment monitoring

FIG. 1 illustrates the cross section view of the device 100 installed in a section of pipe 121 with fluid flowing 120 inside of the pipe at the direct where arrow is pointing. The device's invasive sensing compartment 105 is connected to the pipe and in contact with the measuring fluid. Inside of the invasive compartment, there is an ultrasonic first transducer 101 and an ultrasonic second transducer 104 fixed to the invasive compartment with wire coming out to the upper electronic compartment 117. During flow rate measurement, the first ultrasonic transducer 101 emits a controlled signal and second ultrasonic transducer 104 receives the emitted signal at a delayed time, which is also called downstream time of flight (TOF) when flow is downstream. After downstream TOF is recorded, the second ultrasonic transducer 104 becomes the transmitter and first transducer 101 becomes the receiver to measure and record upstream TOF. While the TOF measurement takes place, piezo-resistive pressure sensing element 102 makes pressure measurement and resistance temperature detector 103 measures temperature. The bottom invasive sensing compartment is connected to an upper electronic enclosure 117 via a cylindrical conduit 106 to provide rigid supporting structure and protection of electrical cable connecting individual sensing elements to sensor interface MCU PCB 111. Stackable connector 116 connects multiple PCBs electrically to common DC power, ground, and signal bus. In the electronic enclosure, external system interface PCB 112 provides analog input, digital input, analog output, and digital output interface circuitry to external systems. Also, in the electronic enclosure, a communication PCB 113 has a central processing unit (CPU), peripheral, memory, wired communication, and wireless communication capability to perform data processing, modeling, and communication protocol encoding/decoding. A power supply PCB 114 converts AC and DC power to device DC power level and display 115 showing measurement data locally are also in the electronic enclosure 117.

Figure 2:
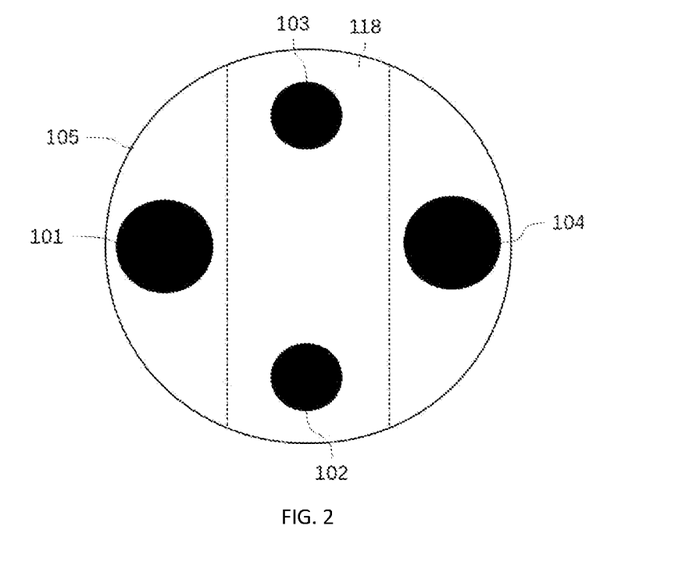
FIG. 2 represents a bottom view of the device for fluid and equipment monitoring

FIG. 2 represents the bottom view of the device 100. A circular shaped invasive sensing compartment 105 houses and protects piezo-resistive pressure sensor 102, resistance temperature detector 103, first ultrasonic transducer 101, and second ultrasonic transducer 104. Sensing compartment surface 118 is typically made out of durable material such as metal offering the protection needed during normal wear and tear.

Figure 3:
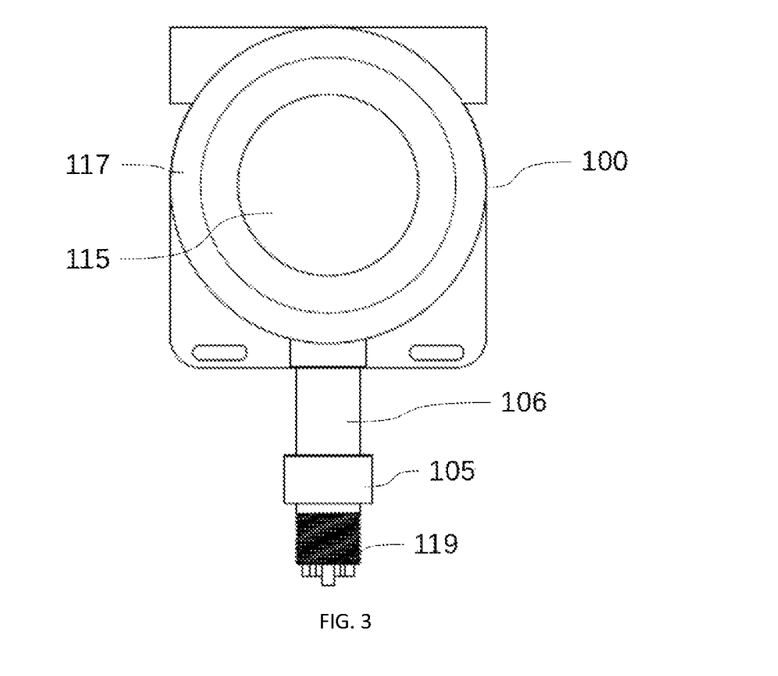
FIG. 3 represents a front view of the device for fluid and equipment monitoring

FIG. 3 shows the entire front view of the device 100. Invasive sensing compartment 105 is at lower portion of the device 100 connecting to conduit 106 to an upper electronic enclosure 117 with display 115 to show measurement result locally. Invasive sensing compartment 105 typically connects to a section of pipe with fluid flows inside or attached to an equipment providing energy source such as pump via threaded connection 119. Other than threaded connection 119, flange, epoxy, pressure insert, clamping, and welding could also be the connection style between a section of pipe and the present invention device.

Figure 4:
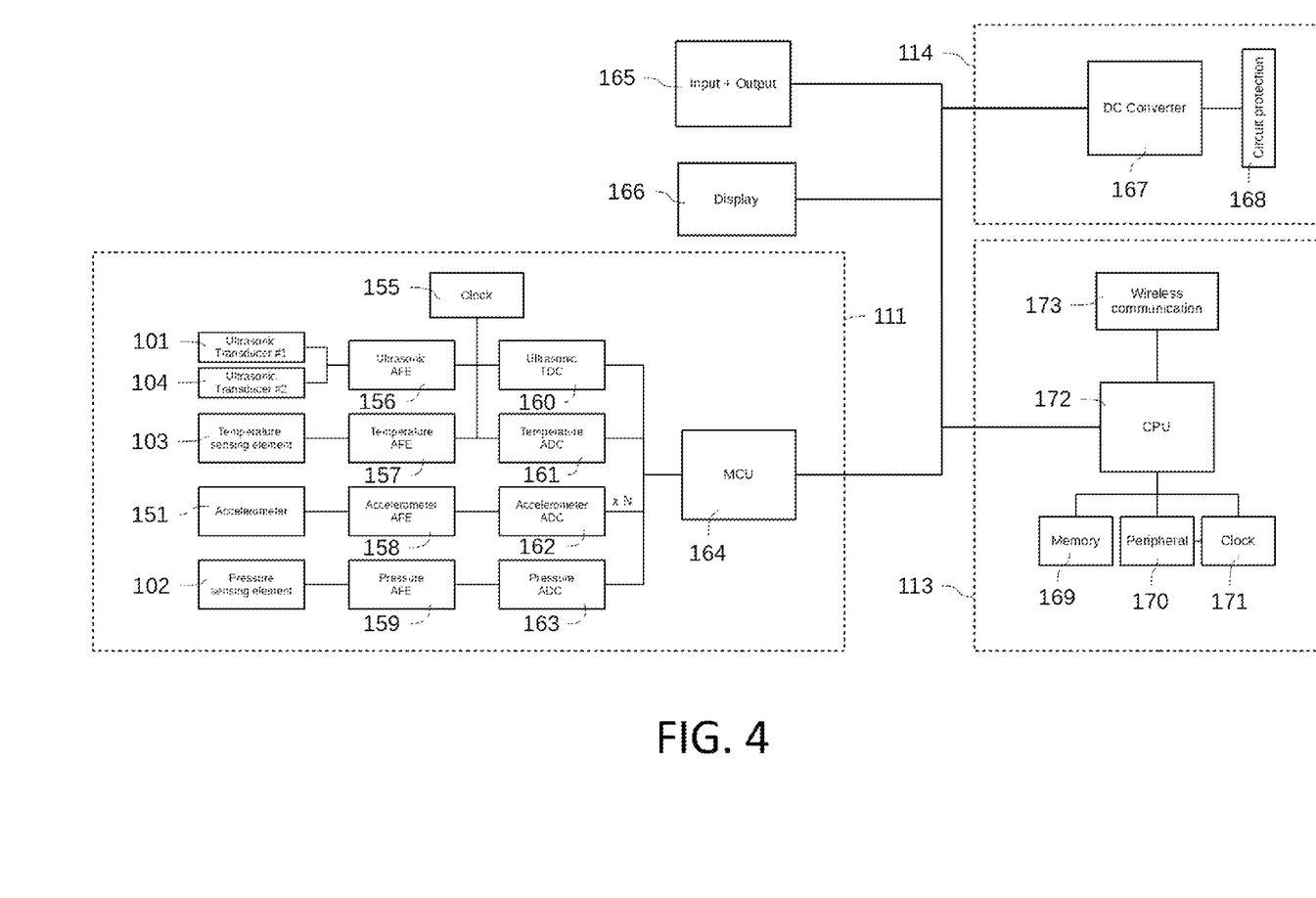
FIG. 4 represents an electronic architecture block diagram of the device for fluid and equipment monitoring

FIG. 4 captures the electronic architecture in a block diagram illustration. Sensing Interface MCU PCB 111 starts with the first ultrasonic transducer 101 and second ultrasonic transducer 104 connect to an analog front end circuitry 156 that is comprised of a multiplexer (MUX) controlling transmit and receive functionality of each transducer, clock divider, transmitter signal generator to generate preset ultrasonic signal, low noise amplifier (LNA) and programmable gain amplifier to amplify measured ultrasonic signal, comparator detects amplified signal above a preset threshold, and serial communication unit to control different AFE settings such as amplifier gain level, MUX channel, and comparator detect threshold. Connecting to the AFE circuitry is time to digital converter circuitry that acts as "stop watch" to count number of pre-defined clock cycles between transmitted and received signal in order to calculate TOF. The pre-defined clock cycle is generated by a clock circuit 155 and shared between ultrasonic AFE and TDC circuitry. Resistance temperature detector sensing element 103 changes its resistance in proportion to its temperature change, a constant voltage source and fixed value bridge resistor array based AFE circuit connects to the temperature sensing element converting the temperature-based resistance change into output voltage change, which is sampled by temperature ADC 161. An array of triple axis MEMS accelerometer 151 typically three in an offset layout orientation connects to an analog front end circuit to convert micromechanical accelerometer movement into proportional output voltage, which is sampled by accelerometer ADC 162. A pressure sensing piezo-resistive element 102 produces small resistance change proportional to pressure change and a full bridge resistance conditional circuit with constant excitation voltage connects to the Piezoresistive element converting the small resistance change into small output voltage change. The AFE circuit output voltage is then amplified through a programmable gain amplifier (PGA) as the pressure sensing AFE 159 output signal level prior to pressure ADC 163. Once all measurement result is ready in ultrasonic TDC 160 (time digital converter), temperature ADC 161, accelerometer ADC 162, and pressure ADC 163 data buffer, microcontroller unit 164 sequentially access the measurement result to perform data processing and calculation explained in more detail in FIG. 5 device software process.

Figure 5:
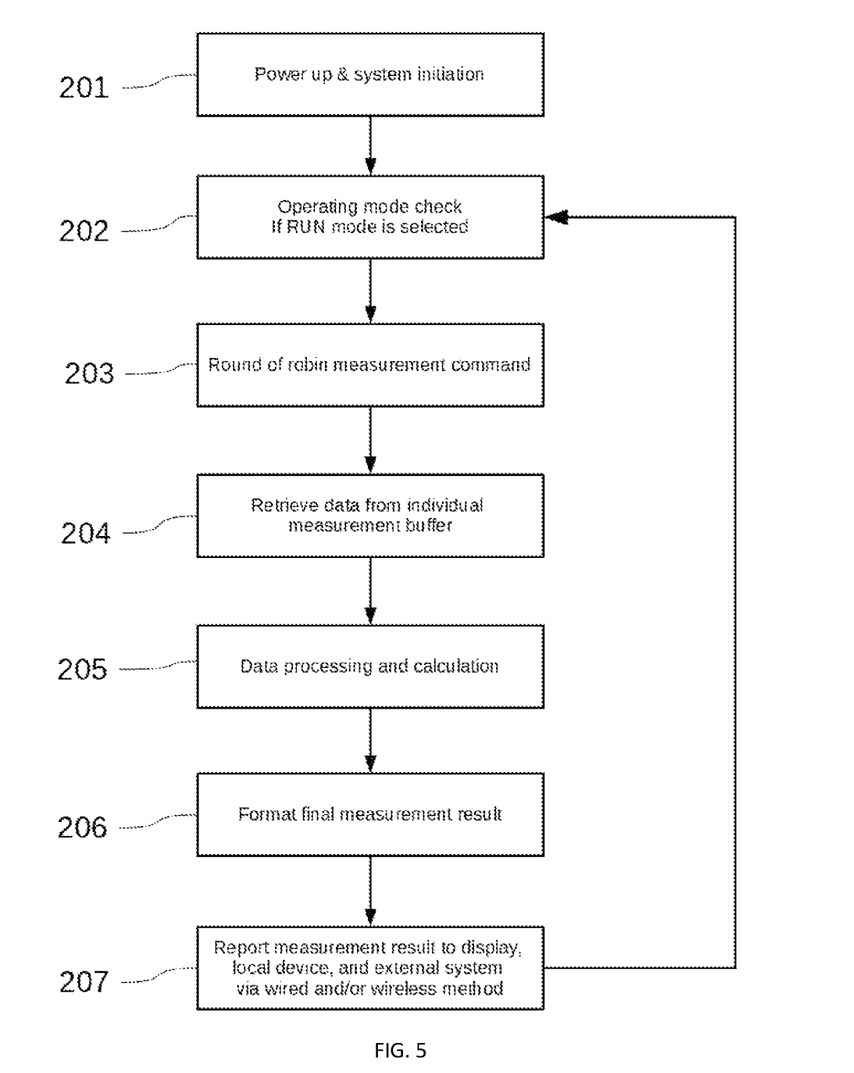
FIG. 5 represents a software process flow chart of the device for fluid and equipment monitoring

FIG. 5 represents the software process of the device. Upon receiving electrical power from extern sources such as DC power supply, AD power supply, and battery based portable power source; the present invention initializes its electronic hardware by resets internal memory register to default level, fill peripheral setting with pre-defined values, and indicate the power up and system initiation step 201 is completed on the display locally. Next, the system checks its operating mode 202, if run mode is selected, the device goes into normal data acquisition and measurement mode. Other mode include diagnostic mode to troubleshoot any fault generated by the device, calibration mode to calibrate individual sensing element for higher accuracy, debug mode to assist development and debug of the device, and any other special function modes. Once device is powered up, initialized, and in run mode; a round of robin measurement command 203 is send to each sensing element data acquisition chain to start taking measurement in parallel. Since the action of sending individual command is on a serial bus, technically the command is sent out in a sequential fashion but the sequential command time is very small and can be neglect. For example, if MCU runs at 16 MHz, and each command takes 24 clock cycles to send, the sequential time between each measurement command is only 1.5 microseconds. Once all start measurement command is sent, measurement takes place in parallel through its individual hardware data acquisition chain. At the completion of each individual senor data acquisition, dedicated measurement buffer is filled with measurement result, MCU then retrieves the resultant data from each measurement buffer sequentially 204. After retrieving all of the measurement data, a data processing and calculation step 205 takes place. Data processing technique used are standard widely used algorithms include noise filtering, averaging, outlier removal, fast Fourier analysis (FFT) and signal filtering. Calculation step takes place by multiplying previously calibrated coefficient to linearize raw measurement data, converting unit, and compute data with known variable. For example, ultrasonic flow velocity measurement needs to be multiplied by a coefficient converting post ADC value to physical unit such as meter per second, meter per second then being converted to a different unit such as feet per minute, flow velocity multiple by the know pipe cross sectional area to obtain volumetric flow rate such as gallon per minute (GPM). After data processing and calculation step 205, measurement data is formatted in to byte stream with appropriate communication protocol wrapping around it 206 to prepare for reporting. For example, the individual measurement calculation result is often a floating point value that needs to be converted into byte stream with specific communication protocol controlling data flow in order to report to external system and within each byte has most significant bit (MSB) formatting meaning the first bit transmitted is the most significant bit of the byte. Final step is reporting the measurement result 207, typically measurement result reports to local display and external system such as remote server, control system, and supervisory control and data acquisition (SCADA) via wireless and/or wired network.

Figure 6:
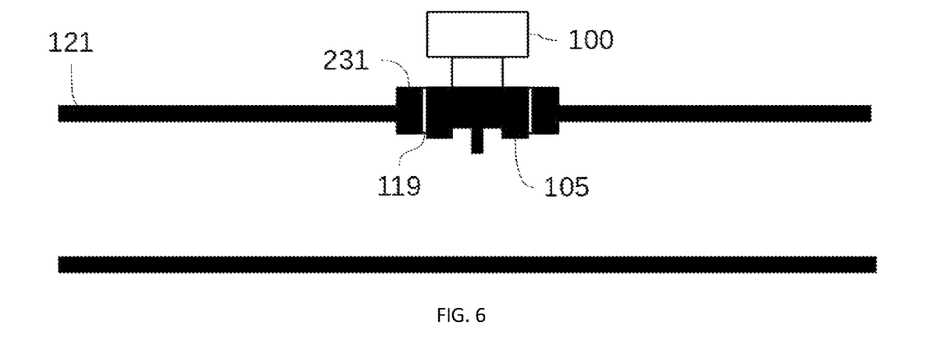
FIG. 6 represents a mechanical installation example of the device for fluid and equipment monitoring

In FIG. 6, a typical device 100 mechanical installation example is shown. A section of pipe 121 has a threaded opening 231 typically has ¾ inch thread size according to national pipe thread standard in the United States and various international standard in the rest of the world. The device invasive sensing compartment 105 is threaded on the outside as previously discussed and pipe threaded opening 231 mates with the sensing compartment 105 thread to form a threaded seal connection 119 under pressure. The process of install and remove the device through threaded seal connection is quick and simple thus saves installing material cost and time making scaling up the device more cost effective.

Figure 7:
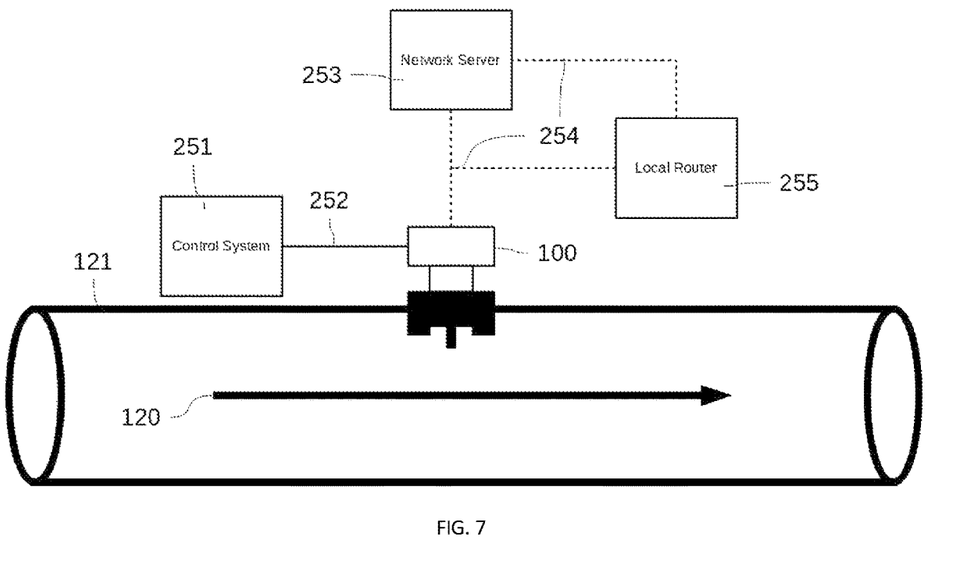
FIG. 7 represents a single device usage example of the device for fluid and equipment monitoring

In FIG. 7 a single device usage example of the device for fluid and equipment monitoring is shown. A device for fluid and equipment monitoring 100 is installed on a section of pipe 121 with fluid flows 120 inside. The device makes measurement and formatted measurement result for reporting, software process is explained in FIG. 5. There are a couple ways for the device to report to external systems.

First method, an external control system 251 such as programmable logic controller (PLC) connects to the device 100 via wired method such as copper cable with multiple conductors inside and fiber optical cable and the device 100 reports measurement data through standard serial communication protocol such as ASCII byte stream and Modbus, digital output, and analog output. Second method in addition to the first, the device 100 wirelessly connects 254 to an on-premises local router 255 and/or non-premises network server 253 located far away from the device reporting data using standard network protocol. The device 100 is capable of supporting many different methods and external systems at the same time offering measurement result reporting redundancy in case one or more external systems are down for unplanned reason.

Figure 8:
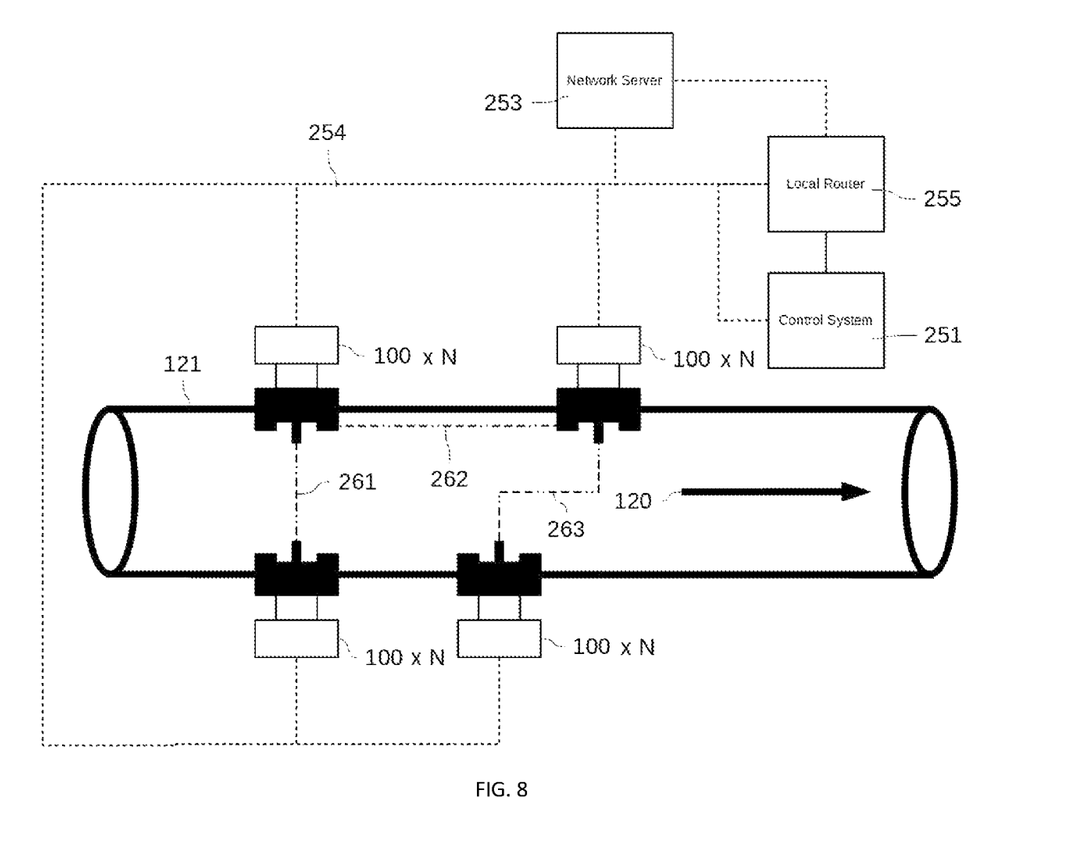
FIG. 8 represents multiple devices usage example of the device for fluid and equipment monitoring

FIG. 8 represents multiple devices usage example of the device for fluid and equipment monitoring 100 in a section of pipe 121 with fluid flows 120 inside. One embodiment is two devices installed radially with a radial space 261 between the two offering multiple measurement points of the same section of fluid. Another embodiment has two devices mounted linearly with linear space 262 between the two providing additional measurement parameter such as differential pressure data by subtracting the two device pressure measurement data. Another embodiment has two devices both linearly and radially spaced apart 263 providing multiple measurement points at different spots on the monitoring fluid and equipment. Similar to the single device usage example, multiple devices report to wired control system 251, wireless on-premises local router 255, and wireless non-premises network server 253.

Figure 9:
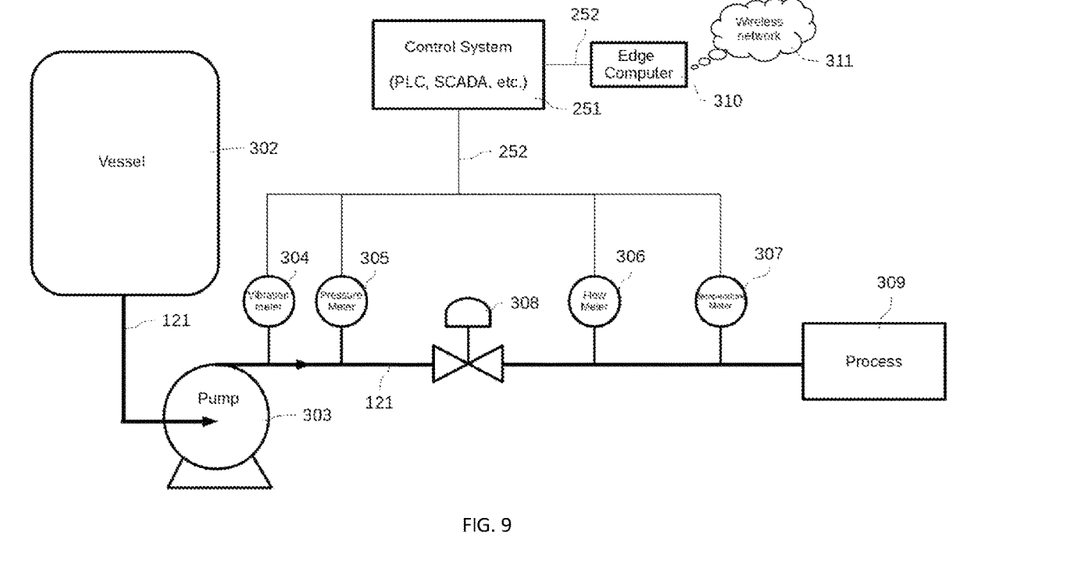
FIG. 9 represents an example of using current existing instrumentation solutions for fluid and equipment monitoring

FIG. 9 represents an example of using current existing instrumentation solutions for fluid and equipment monitoring. A vessel 302 with fluid filled inside connects to one end of a section of sealed pipe 121 and another end of the pipe connects to the intake of a pump 303, which converts electrical energy into mechanical energy by intake lower pressure liquid and discharge the liquid at higher pressure by spinning the pump turbine at high rate for example 3600 RPM. The discharge port on the pump is connected to a regulator valve 308 to control flow rate via changing the back pressure of the system via a section of pipe 121. Fluid at regulated pressure and flow rate flows into a process 309 to perform pre-designed task such as mixing, blending, precipitation, and heat treating. Along the section of pipe 121 connecting pump, pressure regulator, and process; multiple existing single purpose instrument is needed to provide fluid and equipment monitoring to ensure fluid flows into the process at specified condition and rotating equipment such as pump operates at optimum speed. A vibration meter 304 connects to the section of pipe close to the pump measures pump vibration time series data and process the data into frequency domain by applying FFT to monitor the pump speed. A pressure meter 305 is connected to either pump discharge port or pressure regulator outlet to measure the pressure of the fluid ensuring process 309 intake pressure requirement is met. A flow meter 306 is positioned downstream from the regulator valve 308 for measuring the fluid flow rate to control the proportional-integral-derivative controller ensuring regulator valve 308 functions properly and process intake flow rate requirement is met. A temperature meter 307 such as RTD or thermocouple is needed to ensure process intake fluid temperature is within the designed range. wired connection 252 is needed between each individual instrument and control system 251 providing DC power and data communication for control system to receive measurement data. In order to remotely report and control the local control system, an edge computer 310 connecting to control system for power and signal 252 with wireless communication capability is needed to transmit data remotely on a wireless network 311.

Figure 10:
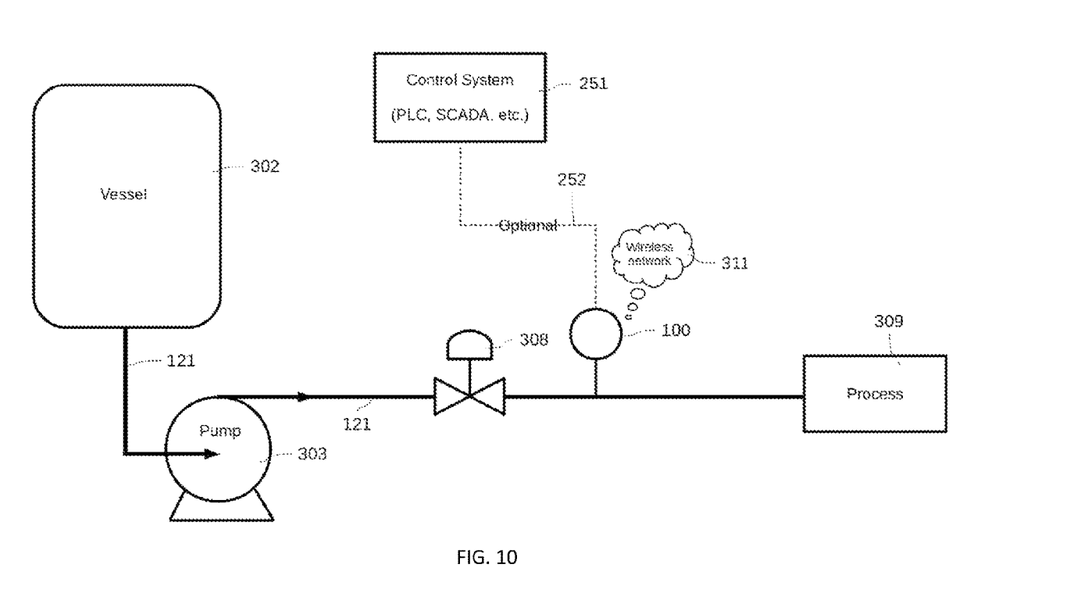
FIG. 10 represents an equivalent example of using the device for fluid and equipment monitoring

In FIG. 10, an equivalent example of FIG. 9 using the present invention device for fluid and equipment monitoring is shown. Similar to FIG. 9, a vessel 302 holds fluid typically in liquid phase connects to a pump 303 via a section of pipe 121 and discharge of the pump connects to a regulator valve 308 to control the pressure and flow rate flows into a process 309 such as mixing, blending, precipitation, and heat treating. Instead of using multiple currently existing single purpose instrument to monitor the fluid and equipment condition shown in FIG. 9, a single device 100 is the only instrument needed to achieve the same monitoring requirement. The device 100 is capable of being powered by a battery instead of receiving power from a wired control system connection thus reduce the material cost and time running protective conduit with electrical cable inside. The device 100 communicates to non-premises network server via wireless network, optionally it connects to an external control system such as PLC, SCADA, or DCS to report monitoring result.

One specific technical application area of the present invention device 100 is anomaly detection. Anomaly detection focuses on finding patterns that do not agree with prior history or expected system outcome. In a system where the present invention device 100 is installed, multiple system parameters such as pressure, temperature, flow, and vibration are measured simultaneously and compared to historical data to detect any anomaly on the system. In addition, recently obtained measurement data is saved into the system historical database for future data to compare against.

A specific example of anomaly detection using the invention device 100 is fluid density monitoring. In a homogeneous fluid transportation system, the density of the fluid is designed to be the same anywhere between the original locations to destination. However, density of the fluid might change slightly in the real world due to scale buildup inside of the pipe, impurity of the transported fluid, chemical injection, etc. The well-known Bernoulli equation states that, $$P + \frac{1}{2}\rho V^2 + \rho gh = \text{constant}$$

Where the assumptions are: points one and two lie on a streamline, the fluid has constant density, low is steady, and there is no friction. Within the equation, P is the pressure, ρ is the density, V is velocity, h is elevation, and g is gravitational acceleration. Along various points in a homogeneous fluid transportation system, the value of the constant term can be calculated using the transportation system pressure and elevation at various locations. Once the value of constant term is obtained along various locations on the fluid transportation system, with the present invention device 100 pressure and flow velocity measurement, the actual density of the fluid can be calculated along various locations on the fluid transportation system. The actual fluid density calculated from the device 100 measurement is compared to original homogeneous fluid density to monitor the fluid density change and identify trouble spots along the system.

Another specific technical solution the present invention device provides is target measurement within a fluid proportional-integral-derivative (PID) control loop. Typically a regulator value such as regulator valve 308 in FIG. 10 actuates to control the fluid back pressure thus cause fluid to flow at a target flow rate. The three components (proportional, integral, and derivation) of the PID controller regulates valve parameter such as amount of cross-sectional area opening, frequency of the valve opening, and duty cycle of the valve to achieve target flow rate. The equation of PID controller is given below:

$$u(t) = k_p e(t) + k_i \int_0^t e(\tau)d\tau + k_d \frac{de}{dt}$$

In which u(t) is the control signal, e is the control error, $k_p$ is the proportional gain, $k_i$ is the integral gain, and $k_d$ is the derivative gain. However, there needs to be a flow rate measurement feedback into the closed control loop. In reality, the flow rate measurement is compensated with fluid pressure and temperature to be more accurate. In this specific application example, the present invention device 100 provides the flow rate measurement into the closed PID feedback loop.

Figure 11:
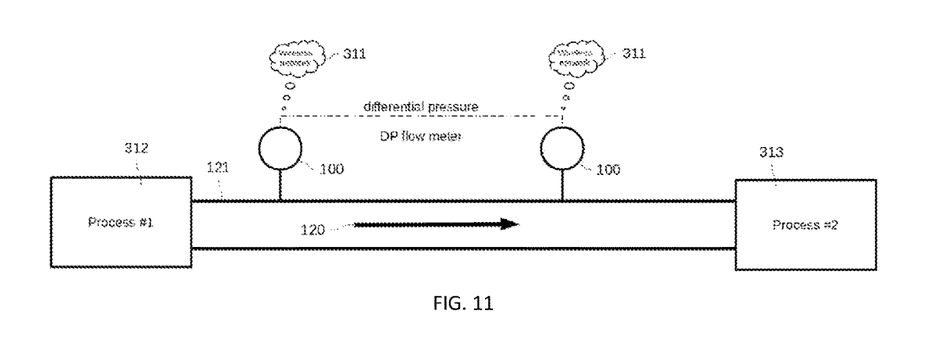
FIG. 11 represents an application example of using at least two devices for fluid and equipment monitoring

FIG. 11 represents an application example of using at least two devices for fluid and equipment monitoring to measure and report differential pressure. The first process 312 such as multiphase fluid separation to isolate liquid from gas is followed by a second process 313 such as liquid precipitation to settle out the remaining solid within the liquid; connecting the two different processes is a section of pipe 121 with fluid 120 flows inside. In addition to each device conducts its own measurement, differential pressure can be obtained by subtracting the pressure measurement from each device when fluid flows through an orifice plate. The differential pressure measurement data from the two devices can be used as a differential pressure flowmeter by using principal equation below:

$$q = C_D \frac{\pi}{4} D_2^2 \sqrt{\frac{2(P_1 - P_2)}{\rho(1 - d^4)}}$$

Where q is the volumetric flow rate, $C_D$ is the discharge coefficient and is the area $$\frac{A_2}{A_1}$$

ratio, $P_1$ is the pressure at first measurement location, $P_2$ is the pressure at second measurement location, p is the fluid density, $D_2$ is the orifice, venture, or nozzle inside diameter, $D_2$ is the upstream and downstream pipe diameter, and d is $$\frac{D_2}{D_1}$$

the diameter ratio. In addition to the TOF based ultrasonic flowmeter capability each device provides, a differential pressure flowmeter is also available simply by installing two present invention device 100 with an orifice plate in between. At the system level, the flow rate monitoring accuracy improves significantly by having two different physics principal based and independent flow rate measurement methods.

Figure 12:
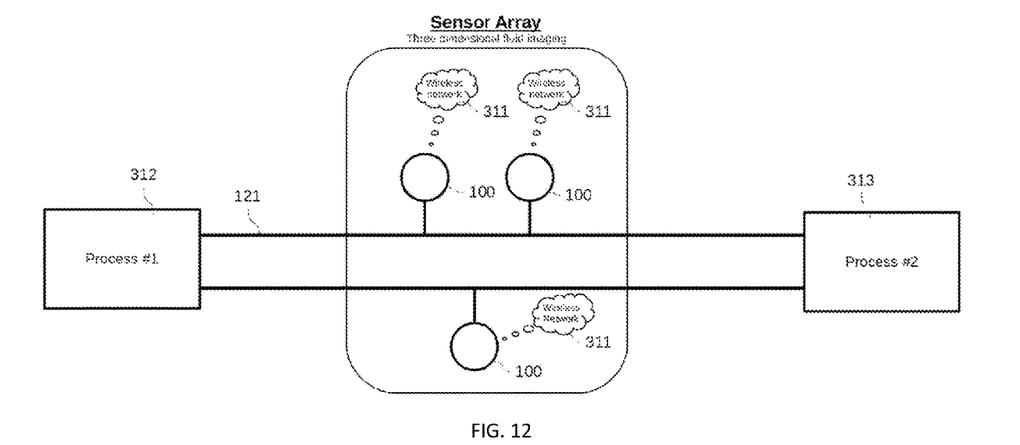
FIG. 12 represents an application example of using at least three devices for fluid and equipment monitoring

FIG. 12 represents an application example of using at least three devices for fluid and equipment monitoring to build a sensor array providing three-dimensional fluid imaging. In addition to the differential pressure flowmeter application using two devices, a sensor array with at least three devices installed at both linear and radial offset distance can be formed to monitor three-dimensional fluid image between the first process 312 such as multiphase fluid separation to isolate liquid from gas is followed by a second process 313 such as liquid precipitation to settle out the remaining solid within the liquid; connecting the two different processes is a section of pipe 121 with fluid 120 flows inside. In fluid image application, each individual device measurement is compared to others checking if uniform fluid characteristics is achieved at different locations on the section of pipe 121 with linear and radial offset distance. If individual device reports the same measurement result, then uniform fluid condition is achieved and fluid inside transports at previously designed condition. When individual device reports different measurement result, abnormal can be traced to the approximated location by locating the device with different measurement result among all of the devices installed. Due to the cost effectiveness of the present invention, scale up to monitor a complex system such as chemical plant and refinery is much cost effective compare to existing solutions.

Figure 13:
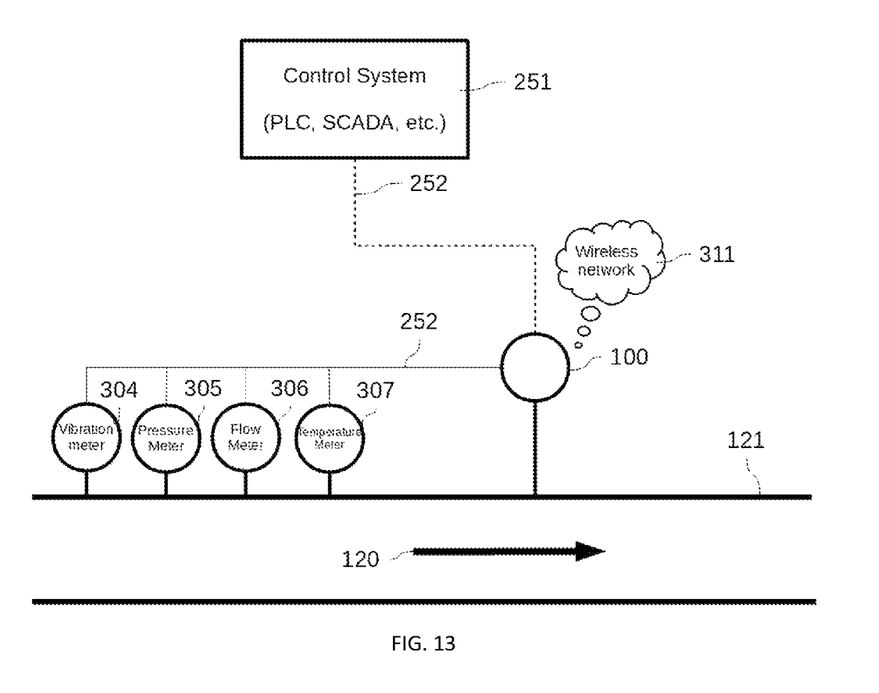
FIG. 13 represents an application example of using multiple existing single purpose instruments in addition to the device

FIG. 13 represents an application example of using multiple existing single purpose instruments in addition to the device 100. In this example, multiple functional single purpose instruments such as vibration meter 304, pressure meter 305, flow meter 306, and temperature meter 307 are installed along with the device 100 on a section of pipe 121 with fluid flows inside 121. A wired bus 252 connects between the device 100 and individual single purpose instrument for data exchange. The device 100 receives measurement data from individual single purpose instrument, process the data, and report results to either a local control system 251 via wired connection 252 or remote server via wireless network.

Figure 14:
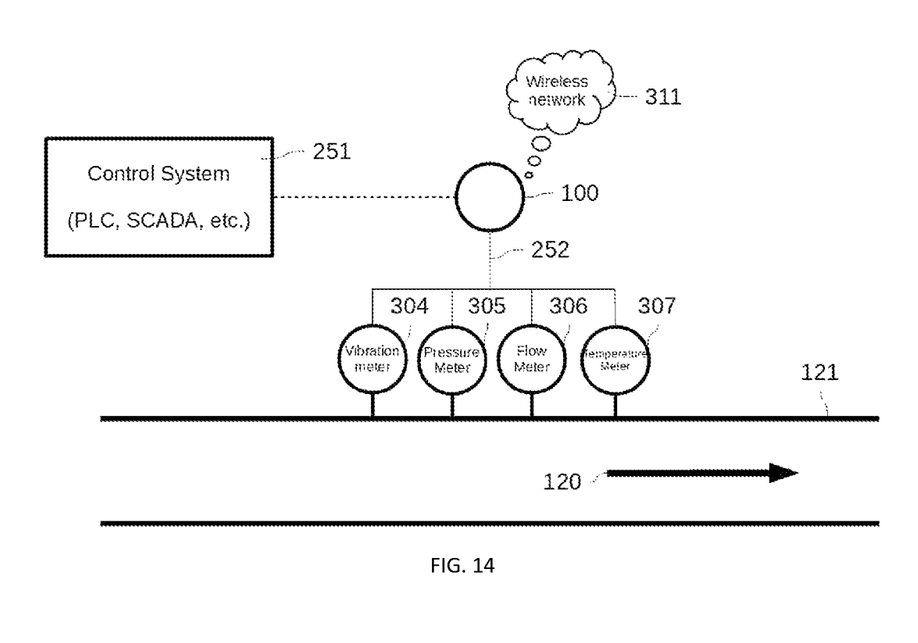
FIG. 14 represents an application example of using multiple existing single purpose instruments connecting to and utilizing the device as an interface point to external systems

FIG. 14 represents an application example of using multiple existing single purpose instruments connecting to and utilizing the device 100 as an interface point to external systems. In this example, multiple functional single purpose instruments such as vibration meter 304, pressure meter 305, flow meter 306, and temperature meter 307 are installed along a section of pipe 121 with fluid flows inside 120. The device 100 is not installed along the section of pipe 121, it's only connected to individual single purpose instrument via wired network 252 and acting as an interface point between individual instrument and external control system 251 and remote wireless network server 311. The sensing element compartment of the device could be eliminated to further reduce system cost in this configuration. In addition, a portion of the electronics inside of the device 100 could be eliminated to further reduce mechanical size allowing the device 100 more easily connects to any individual single purpose instrument.

Figure 15:
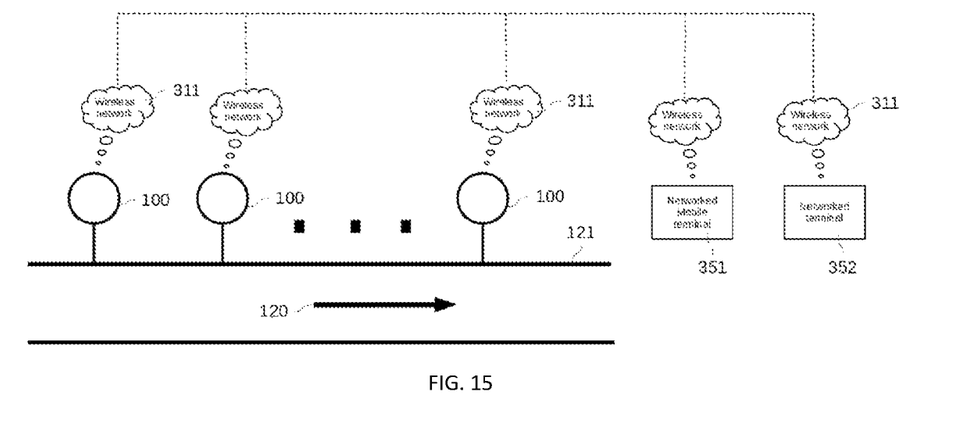
FIG. 15 represents an application example of accessing data within multiple devices via wireless network
Figure 16:
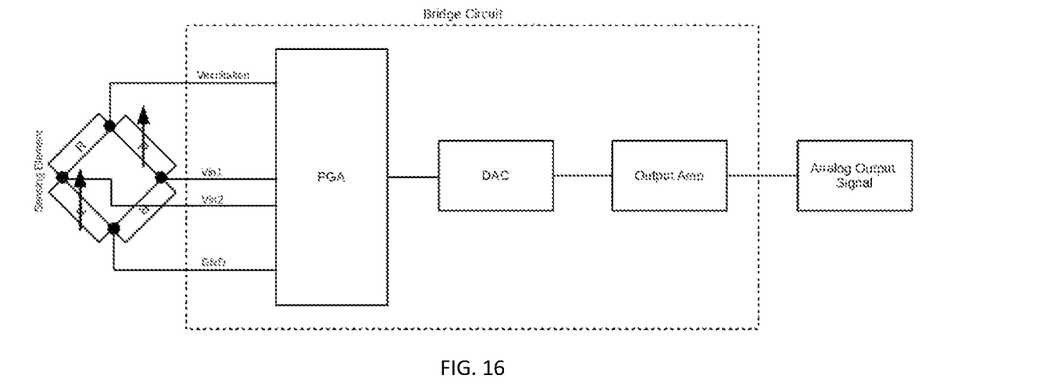
FIG. 16 is a schematic representation of a bridge circuit which is used with a piezo-resistive pressure sensing element in order to increase sensitivity.

FIG. 15 represents an application example of accessing data within multiple devices via wireless network 311. Multiple devices 100 are installed along a pipe 121 with fluid flows inside 120. External networked terminal 352 such as a personal computer is connected to all of the device 100 via wireless network. Data such as measurement result from individual device 100 exchanges with the networked terminal 352. The networked terminal 352 can be substituted with a networked mobile terminal 351 such as a tablet or cell phone.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated.

What is claimed is:

1. An apparatus for fluid and equipment monitoring comprising:
   a display to show measurement results,
   a display circuit,
   an external system interface circuit to provide digital/analog input and output,
   a communication circuit to provide wired and/or wireless remote communication to other systems,
   an invasive section, said invasive section having a sensing compartment, said invasive section adapted to be invasively installed in a measurement fluid medium and/or connected to a section of monitoring equipment, said invasive section comprising, sensing elements, said sensing elements comprising,
      more than a pair of ultrasonic transducers or flow sensing elements,
      a piezoresistive or pressure sensing element arranged to be in contact with the measurement medium,
      a resistance temperature detector or temperature sensing element arranged to be in contact with measurement medium,
   an electronic enclosure, said electronic enclosure enclosing,
      an array of accelerometers arranged in an offset formation relative to each other,
      a microcontroller and/or processor to process and calculate measurement data,
   a connecting pathway, said connecting pathway comprising,
      a sensing interface circuit, said sensing interface circuit adapted to sample, amplify, and
      condition signals produced by each of the sensing elements,
   wherein said invasive section is either,
      (i) threaded, wherein said invasive section can mate with an external pipe, a container, or with monitoring equipment,
      (ii) flanged to enable mating with an external pipe, a container, or with monitoring equipment, or
      (iii) adapted to mate with external pipe, a container, or with monitoring equipment via a pressure insert and clamp.

2. An apparatus for fluid and equipment monitoring comprising:
   a display to show measurement results,
   a display circuit,
   an external system interface circuit to provide digital/analog input and output,
   a communication circuit to provide wired and/or wireless remote communication to other systems,
   an invasive section, said invasive section having a sensing compartment, said invasive section adapted to be invasively installed in a measurement fluid medium and/or connected to a section of monitoring equipment, said invasive section comprising, sensing elements, said sensing elements comprising,
      a pair of ultrasonic transducers or flow sensing elements, wherein the flow sensing elements are further comprised of inline turbines, in which the turbine rotational rate is proportional to the flow rate of fluid through the inline flow sensing elements,
      a piezoresistive or pressure sensing element arranged to be in contact with the measurement medium,
      a resistance temperature detector or temperature sensing element arranged to be in contact with measurement medium,
   an electronic enclosure, said electronic enclosure enclosing,
      an array of accelerometers arranged in an offset formation relative to each other,
      a microcontroller and/or processor to process and calculate measurement data,
   a connecting pathway, said connecting pathway comprising,
      a sensing interface circuit, said sensing interface circuit adapted to sample, amplify, and condition signals produced by each of the sensing elements,
   wherein said invasive section is either,
      (i) threaded, wherein said invasive section can mate with an external pipe, a container, or with monitoring equipment,
      (ii) flanged to enable mating with an external pipe, a container, or with monitoring equipment, or
      (iii) adapted to mate with external pipe, a container, or with monitoring equipment via a pressure insert and clamp.

* * * * *